(12) United States Patent
Eppinger et al.

(10) Patent No.: US 7,286,519 B2
(45) Date of Patent: Oct. 23, 2007

(54) METHOD AND DEVICE FOR SYNCHRONIZING TO A CDMA-SIGNAL THAT CONTAINS A PILOT SEQUENCE

(75) Inventors: Bernd Eppinger, Munich (DE); Jens Kuehne, Kirchseeon (DE); Hardy Scheidig, Buchbach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 804 days.

(21) Appl. No.: 10/623,704

(22) Filed: Jul. 22, 2003

(65) Prior Publication Data

US 2004/0136353 A1  Jul. 15, 2004

Related U.S. Application Data

(63) Continuation-in-part of application No. PCT/EP02/00196, filed on Jan. 10, 2002.

(30) Foreign Application Priority Data

Jan. 22, 2001  (DE) ................. 101 02 709

(51) Int. Cl.
  H04B 7/216  (2006.01)
  H04B 1/38  (2006.01)
  H04J 3/06  (2006.01)
  H04M 1/00  (2006.01)

(52) U.S. Cl. ..................... 370/342; 370/350; 370/441; 370/335; 455/561; 455/550.1; 455/556.2

(58) Field of Classification Search ........ 370/375–376, 370/335–337, 340–342, 441, 314, 345, 458–459, 370/503–520, 320–321, 294, 326, 263, 330, 370/140–150, 354–368, 152, 249, 310, 310.2, 370/324, 328–329, 338, 350, 479, 500, 535, 370/537; 455/560–561, 403, 422.1, 550.1, 455/556.2, 126, 265, 324; 375/140–150, 375/152, 325, 327, 373, 341–345, 353–371
See application file for complete search history.

(56) References Cited

U.S. PATENT DOCUMENTS 5,544,155 A  8/1996 Lucas et al.

(Continued)

FOREIGN PATENT DOCUMENTS

EP  0/880/238 A2  11/1998

(Continued)

OTHER PUBLICATIONS

Holbrook et al; "A crosscorrelation reduction receiver robust to the near-far effect"; Proceedings of The Annual International Phoenix Conference on Computers and Communications; Scottsdale, NY; Apr. 1-3, 1992; IEEE, USA.

*Primary Examiner*—Meless Zewdu
(74) *Attorney, Agent, or Firm*—Ditthavong Mori & Steiner, P.C.

(57) ABSTRACT

A method for synchronizing to a CDMA-signal that contains a pilot sequence, overlaid with data sequences, comprises the following process steps: correlating the total signal consisting of the transmitted pilot sequence and transmitted data sequences with a reference pilot sequence; subtracting the correlation result time-delayed by one or more symbol durations of the pilot sequence from the current correlation result in order to suppress the pilot sequence and subsequent incoherent averaging, and determining the minimum.

14 Claims, 4 Drawing Sheets

U.S. PATENT DOCUMENTS

| | | |
|---|---|---|
| 5,568,473 A | 10/1996 | Hemmati |
| 5,835,489 A * | 11/1998 | Moriya et al. ............... 370/342 |
| 6,427,531 B1 * | 8/2002 | Chintawongvanich ... 73/170.13 |
| 6,452,936 B1 * | 9/2002 | Shiino ......................... 370/441 |
| 6,456,608 B1 * | 9/2002 | Lomp ........................... 370/335 |
| 6,480,558 B1 * | 11/2002 | Ottosson et al. ............. 375/350 |
| 6,704,349 B1 * | 3/2004 | Masenten ..................... 375/219 |
| 6,836,517 B2 * | 12/2004 | Nagatani et al. ............. 375/296 |

FOREIGN PATENT DOCUMENTS

| | | |
|---|---|---|
| WO | WO/95/24079 | 9/1995 |
| WO | WO/99/37037 | 7/1999 |
| WO | WO/00/55992 | 9/2000 |
| WO | WO/02/058264 A1 | 7/2002 |

* cited by examiner

METHOD AND DEVICE FOR SYNCHRONIZING TO A CDMA-SIGNAL THAT CONTAINS A PILOT SEQUENCE

This is a continuation-in-part of International Application PCT/EP02/00196 with an international filing date of Jan. 10, 2002, which was published on Jul. 25, 2002 in the German language and claims the benefit of German patent application DE 101 02 709.5, filed on Jan. 22, 2001, the contents of both of which are incorporated by reference in their entirety.

BACKGROUND OF THE INVENTION

The invention concerns a method and a device for synchronising for example a receiver to a CDMA-signal that contains a pilot sequence.

CDMA (Code Division Multiple Access) signals are used, for example, for transmission in third-generation mobile radio, for example according to the IS-95, CDMA-2000 or 3GPP standards.

For a better understanding of the invention, a conventional method for generating CDMA-signals will first be explained with reference to FIG. 1. The problem area underlying the invention will then be elucidated. The CDMA-signal is generated in the signal generator 1 from a pilot channel 2, which is part of the control channel, also called DPCCH, and from a plurality of data channels 3, 4, also called DPDCH. The pilot channel 2 and data channels 3, 4, etc., are converted with a generally different spreading code in multipliers 5, 6 and 7 into a spread pilot sequence (spr. Pilot) and spread data sequences (Dat.). These sequences are fed, with different weighting depending on different amplification factors of the amplifiers 8, 9, 10, to a summator 11. In a further multiplier 12, the output signal of the summator 11 is multiplied by the scrambling code, so that a total signal S is produced. S consists of a data component and a pilot component (pilot sequence). The pilot component consists of the spread pilot sequence which was multiplied by the scrambling code. While the data channels 3, 4 are weighted with a factor of, for example, $1/\sqrt{4}$, the pilot channel 2 is only weighted with a factor of $1/\sqrt{256}$. The spreading code of the pilot channel 2 is orthogonal to all the spreading codes of the data channels 3, 4, etc.

When the signal is processed at the receiving end, it is necessary to extract the pilot sequence (Pilot) from the total signal S and to recover the chip clock and the reception timing from the pilot sequence. The CDMA-signal is subdivided into slots (time slots) and the spread pilot sequence is cyclical with a period of one pilot symbol duration which is shorter than the slot duration. By determining the position of the received pilot sequence, the current time offset (timing) with respect to the slot boundary can be determined. The pilot sequence is known to the receiver and is defined by the standard.

The time offset (timing) of the pilot sequence is usually obtained by correlating the received signal with the known pilot sequence, which, however, is contained in the total signal S only with the weighting factor $1/\sqrt{256}$, while each data channel 3, 4 is weighted with a factor of $1/\sqrt{4}$. In contrast to only one pilot channel 2, there are a multiplicity of data channels 3, 4, each modulated with pseudorandom information data. The information data in the data channels 3, 4 therefore act as orthogonal interference with respect to the pilot sequence. Nevertheless; it is not possible to average any number of correlations since the result must be present within a limited time, and because of a usually present frequency offset and the resulting phase shift only very few pilot sequences can be coherently averaged.

It is therefore the object of the invention to specify a method and a device for synchronising for example a receiver to a CDMA-signal that contains a pilot sequence, so that the invention can be used even with a low level of the pilot sequence as compared to the level of the simultaneously transmitted orthogonal data sequences and so that it yields a result within a relatively short time.

SUMMARY OF THE INVENTION

According to a first aspect of the invention, the usual correlation of the total signal consisting of the pilot sequence and the data sequence with a reference pilot sequence is first carried out. By subtracting the correlation result of one or more preceding symbols of the pilot sequence from the current correlation result, the pilot sequence is suppressed. An incoherent averaging then follows to suppress noise. Finally, the minimum is determined.

According to a second aspect of the invention, by subtracting the incoherent averaging result of the data sequences from an additionally generated coherent averaging result of the correlation result, a signal with a relatively clear maximum is produced, which can be detected with greater certainty. In this case the maximum has to be determined instead of the minimum.

The result of the coherent averaging and of the incoherent averaging can be subjected to a specific weighting before the subtraction.

Before determining the maximum, an incoherent averaging over a plurality of slots of the CDMA-signal is advantageously carried out.

Coherent averaging means that a summation over several symbols of the pilot sequences takes place before a complex magnitude is formed, whereas incoherent averaging means averaging of previously formed magnitudes and subsequent summation over several symbol durations of the pilot sequence.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Before two embodiments of a device according to the invention for synchronising for example a receiver to a CDMA-signal containing a pilot sequence are described in detail with reference to FIG. 4 and FIG. 5, the considerations underlying the inventive idea will first be elucidated with reference to FIG. 2 and FIGS. 3A to 3C.

Figure 1:
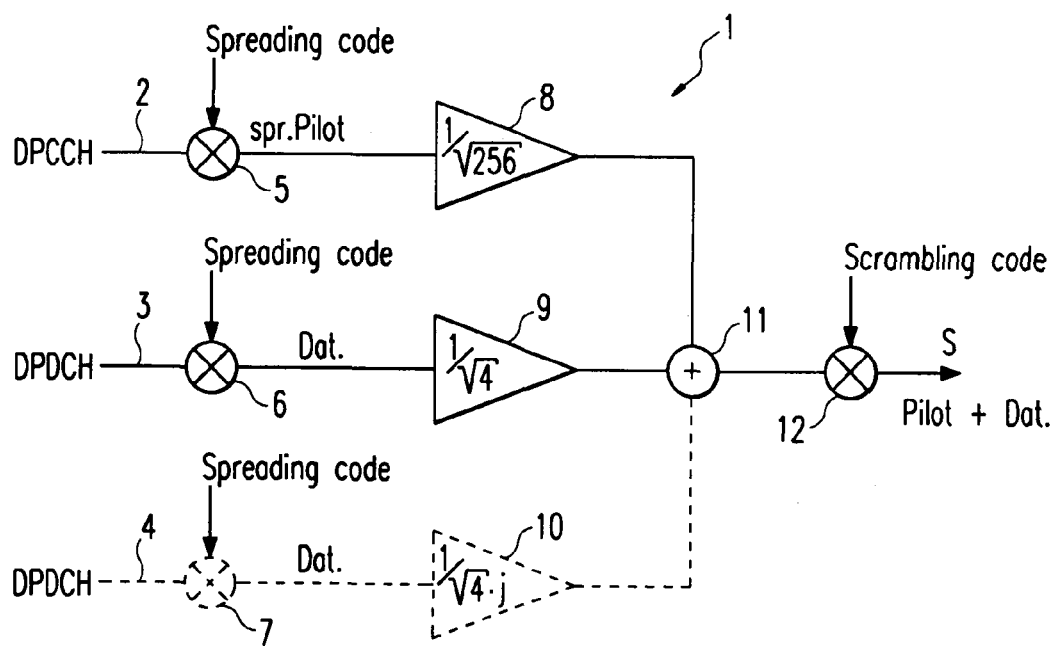
FIG. 1 is a schematic representation of a signal processing device of a CDMA-signal in a transmitter.
Figure 2:
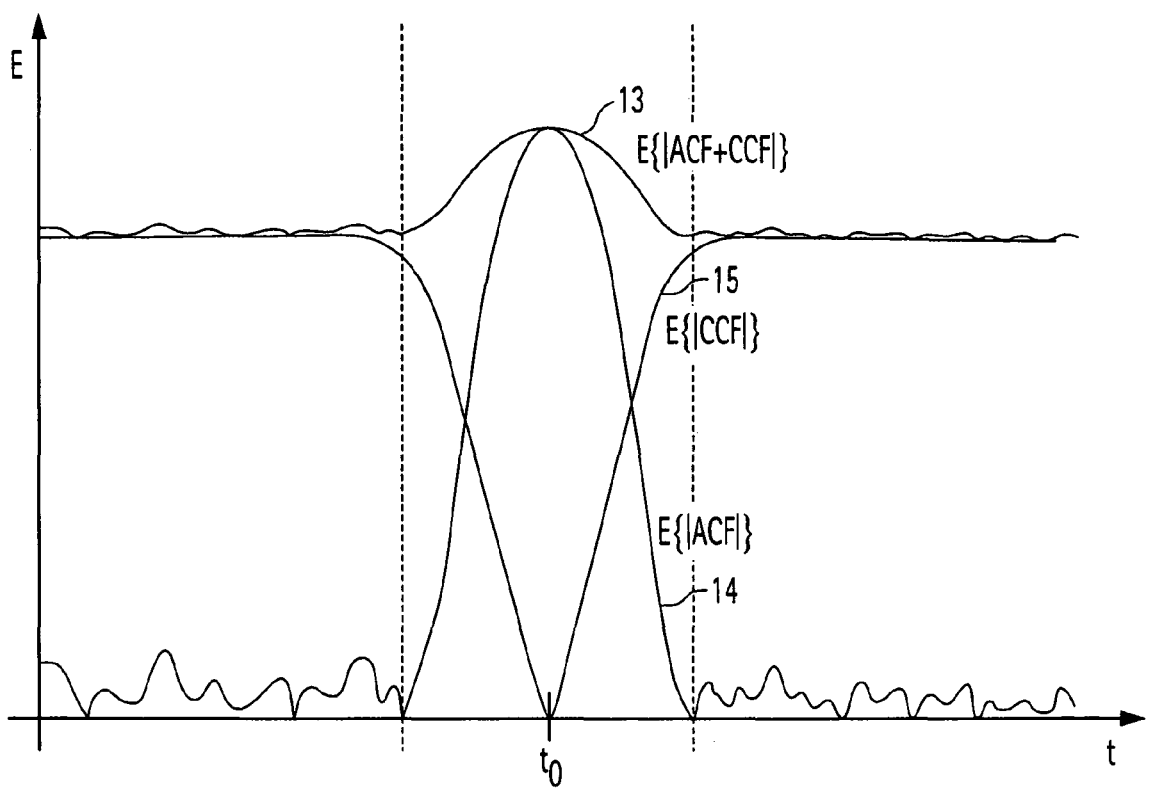
FIG. 2 is a diagram elucidating different expectancy values.

FIG. 2 shows the expectancy value E as a function of the time t at the output of the correlator 17, which correlates the total signal S consisting of the pilot sequence and a plurality of data sequences with a reference pilot sequence RP, which is a priori known to the receiver. The expectancy value at the output of the correlator is represented by the curve 13. The correlation of the total signal S with the reference pilot sequence RP can be thought of resulting from an autocorrelation of the reference pilot sequence (correlation of the reference pilot sequence with itself) and a cross-correlation of the orthogonal data sequences with a reference pilot sequence, so that the total expectancy value $E\{|ACF+CCF|\}$ of the curve 13 is composed of the expectancy value $E\{|ACF|\}$ (curve 14 in FIG. 2) of the autocorrelation of the pilot sequence and the expectancy value $E\{|CCF|\}$ (curve 15 in FIG. 2) of the cross-correlation of the orthogonal data sequences with the reference pilot sequence. If only the pilot sequence is transmitted, the correlator generates a signal with the expectancy value $E\{|ACF|\}$ at its output (curve 14). A maximum occurs at the time point $t_0$, the time $t_0$ characterising the time offset between the received pilot sequence and the reference pilot sequence. The maximum of the curve 13, i.e. of the expectancy value of a correlation of the reference pilot sequence with a total signal composed of pilot sequences and data sequences, is less distinct in comparison to the curve 14, as the orthogonal data have an interfering effect.

If only orthogonal data sequences without pilot sequence are transmitted, the power expectancy value $E\{|CCF|\}$ of the correletor's output signal is exactly 0 at the symbol time point $t_0$ and therefore minimal. This is a consequence of the orthogonality of the pilot sequence with respect to the data sequences of the various data channels 3, 4. The orthogonality condition is only exactly fulfilled in case of correct timing, which is at the correct symbol time point $t_0$, so that only at that time point the expectancy value of the correlation is 0. Within a certain time range around the time point $t_0$, the expectancy value rises continuously until, because of the time displacement, the data sequences are completely uncorrelated to the reference pilot sequence and the expectancy value therefore becomes a constant plateau.

If both pilot and data are transmitted, the power of the curves of the expectancy values $E\{|ACF|\}$ and $E\{|CCF|\}$ are approximately added together. In that way, the effects of the maximum of $E\{|ACF|\}$ and the minimum of $E\{|CCF|\}$ partially cancel out, resulting in a signal, the power expectancy value $E\{|ACF+CCF|\}$ of which has only a very small peak, which in addition has a large standard deviation, i.e. has high noise interference. The peak of the total signal $E\{|ACF+CCF|\}$ disappears completely, at the latest, when $E\{|CCF|\}$ becomes as large as the peak of $E\{|ACF|\}$, because of data sequences with a high level, in which case detection is in principle no longer possible, even if incoherent averaging is carried out subsequently.

A recognition of the above-described subdivision of the expectancy value can be used to detect, in addition and apart from the maximum of $E\{|ACF+CCF|\}$, the minimum of $E\{|CCF|\}$, and this information can be used for determining the time offset $t_0$.

Figure 4:
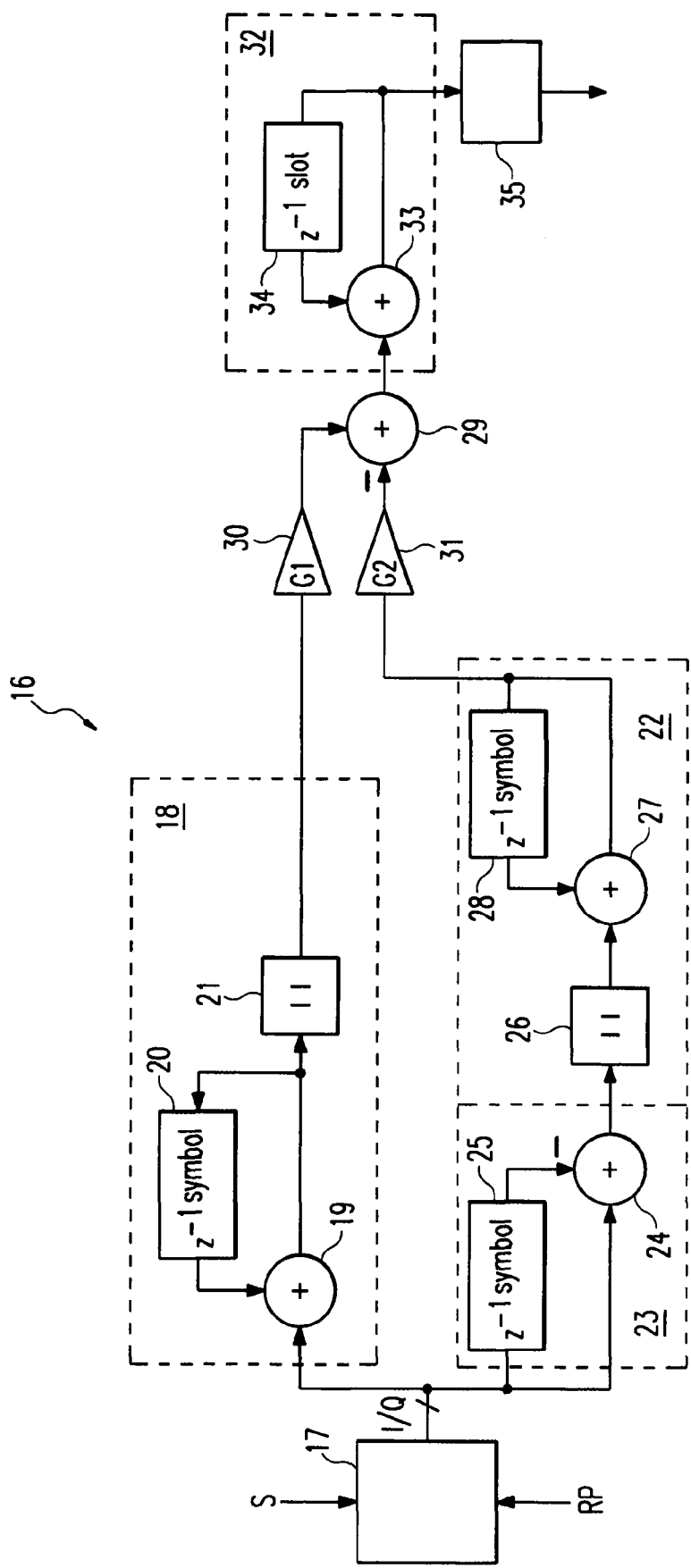
FIG. 4 is a block diagram of a first embodiment device according to the invention for synchronising for example a receiver to a CDMA-signal containing a pilot sequence.

For this purpose, a device 16, an embodiment of which is illustrated in FIG. 4, is proposed.

The received total signal S, which in addition to the pilot sequence (Pilot) contains a plurality of orthogonal data sequences (Dat.), is fed to a correlator 17. The coefficients of the correlator 17 are the reference pilot sequence RP known to the receiver. The correlator 17 generates a complex output signal consisting of a real and an imaginary part. This output signal is first fed to a coherent averaging unit 18. In the embodiment shown, the coherent averaging unit 18 consists of a first summator 19, a second time-delay element 20 and a first magnitude-forming element 21. The time-delay element 20 time-delays the output signal of the summator 19 by one symbol duration of the pilot sequence. The output of the time-delay element 20 is connected to one input of the summator 19, while the other input of the summator 19 is connected to the output of the correlator 17. The output sequence of the correlator 17 is therefore added coherently in the coherent averaging unit 18 and the magnitude of the complex signal is then formed in the magnitude-forming element 21. Because the output signal of the correlator 17 is fed to the coherent averaging unit 18, when pilot and data sequences are transmitted, a signal is produced at its output the expectancy value of which has the shape of the curve 13 in FIG. 2.

In addition, an incoherent averaging unit 22 is provided according to the invention. A subtracting arrangement 23 consisting of a first subtracter 24 and a first time-delay element 25 is connected to the input of the incoherent averaging unit 22. The first time-delay element 25 time-delays the output signal of the correlator 17 by the symbol duration of the pilot sequence, too, so that the current output signal of the correlator 17 is supplied to the positive input of the subtracter 24 and the output signal of the correlator 17 time-delayed by the symbol duration of the pilot sequence is supplied to the negative input. Because, however, the pilot sequence is periodic within its symbol duration, the same must be true for the pilot dependent component of the output-signal of the correlator 17. For this reason, the first time-delay element 25 does not change the pilot dependent component, which therefore is cancelled out in the subtractor 24. In this manner, a signal is produced at the output of the subtracter 24 in which all effects of the pilot sequence are suppressed and which now consists only of the cross-correlation component of the orthogonal data sequences with the reference pilot (RP). This signal is incoherently averaged, i.e. the magnitude is first formed in the magnitude-forming element 26 and a summation with the second summator 27 and the third time-delay element 28 is then performed. The third time-delay element 28 in turn time-delays by the symbol duration of the pilot sequence and connects the output of the second summator 27 to one of its inputs, while the other input of the second summator 27 is connected to the output of the magnitude-forming element 26. As explained later, this incoherent averaging results in a signal, the expectancy value of which corresponds to curve 15 in FIG. 2.

The output signals of the coherent averaging unit 18 and of the incoherent averaging unit 22 are fed to a second subtracter 29, so that the output signal of the incoherent averaging unit 22 is subtracted from the output signal of the coherent averaging unit 18. An amplifying or attenuating element 30 or 31 may also be provided between the output of the coherent averaging unit 18 and the subtracter 29 and/or between the output of the incoherent averaging unit 22 and the subtracter 29, so that the outputs of the averaging units 18 and 22 are weighted with weighting factors G1 and G2 respectively. The weighting factors G1 and G2 may be empirically determined. As subtracter 29 combines the statistically independent information of the coherent and the incoherent averaging unit, a signal the expectancy value of which corresponds to the curve 14 in FIG. 2, i.e. a signal with a substantially more distinct maximum of the expectancy value compared to the curve 13, is produced at the output of the subtracter 29. The maximum of the output signal of the second subtracter 29 and thus the sought-for time offset $t_0$ is determined with a device 35.

Between the second subtracter 29 and the maximum-searching device 35, a further averaging unit 32 may be provided, which consists of a summator 33 and a time-delay element 34, which connects the output of the summator 33 to one of its inputs.

Time-delay element 34 delays its input-signal by one slot (time slot) duration of the CDMA-signal, so that averaging unit 32 averages over as many slots, as is possible due to the allowed reaction time.

Figure 3A:
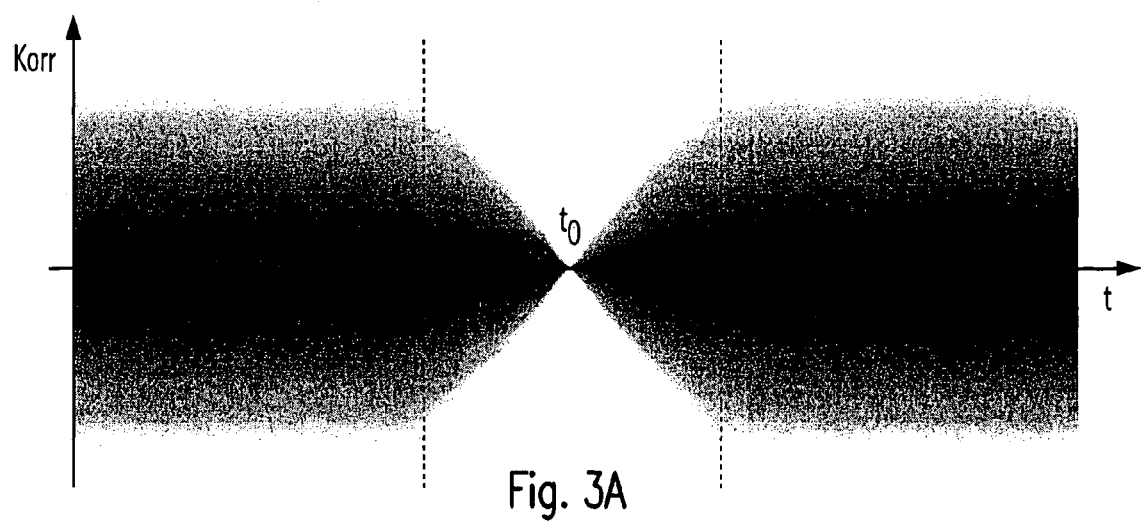
FIG. 3A shows the probability density distribution of the real part at the output of the correlator, when the received signal is a pure data signal without pilot sequence.

For a better understanding of the operation of the subtracting arrangement 23 which implements an E{|CCFl|} detector, the probability density distribution of the output signal of the first subtracter 24 over the time displacement is represented in FIG. 3A. It is assumed that the total signal S contains at least data sequences. Because of the subtracter 24, which suppresses any effect of the possibly present pilot sequence, the signal now contains only the cross-correlation components of the data sequences and no autocorrelation component of the pilot sequence. Whereas the probability density outside of the period $t_0 \pm t_{chip}$ shows a relatively large standard deviation, the scatter at time point $t_0$ is practically 0 and the expectancy value is also 0. In FIG. 3A only the real part of the overall complex signal is represented. The imaginary part has the same shape.

Figure 3B:
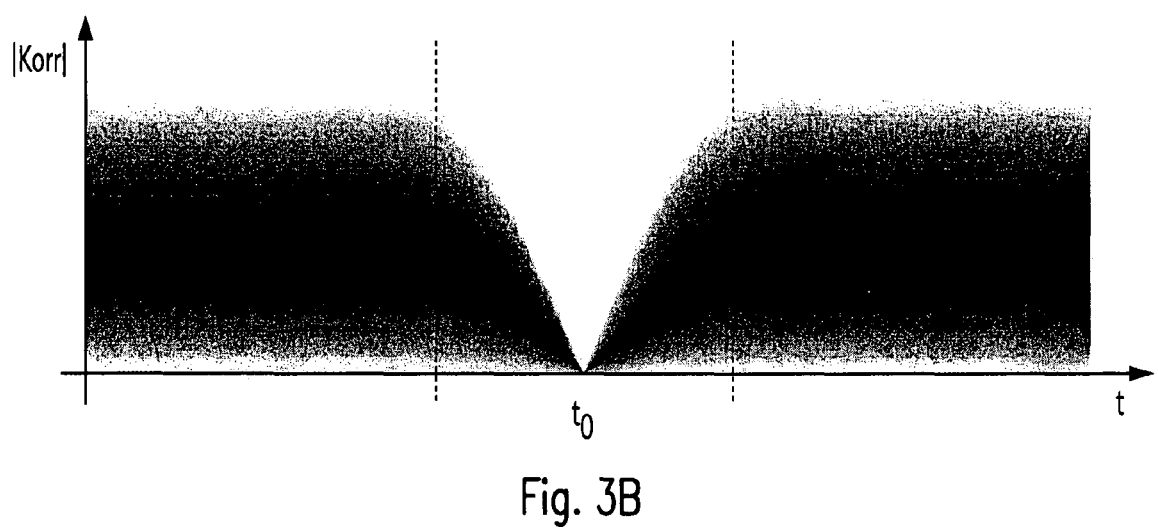
FIG. 3B shows the probability density distribution of the complex magnitude at the output of the correlator, when the received signal is a pure data signal without pilot sequence.
Figure 3C:
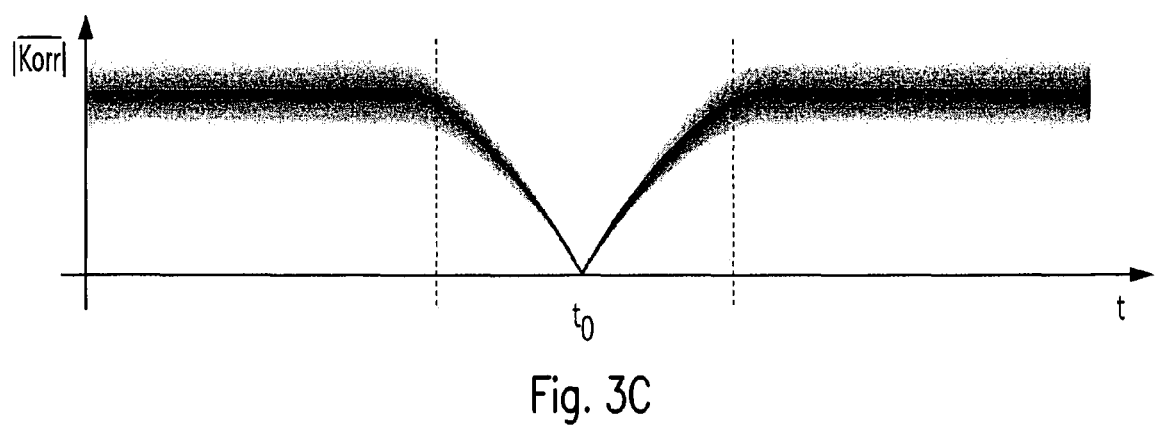
FIG. 3C shows the probability density distribution of the averaged complex magnitude at the output of the correlator, when the received signal is a pure data signal without pilot sequence.

FIG. 3B shows the probability density distribution of the signal at the output of the magnitude-forming element 26 while FIG. 3C shows the signal at the output of the incoherent averaging unit 22. Outside of the period $t_0 \pm t_{chip}$, the magnitude-formation transforms the complex Gaussian distribution at the input of the magnitude-forming element into a real probability density distribution of the form $$x \cdot e^{-x^2} \quad \text{for } x > 0$$
$$0 \quad \text{for } x = 0.$$

This distribution has a mean value clearly different from 0, but still has a considerable standard deviation, as shown in FIG. 3B.

The standard deviation can be reduced by subsequent averaging, as represented in FIG. 3C.

FIGS. 3A to 3C make clear that the expectancy value E{|CCFl|} from FIG. 2 can be approximately determined by incoherent averaging, i.e. magnitude-formation and subsequent averaging.

The method according to the invention and the device according to the invention also provide a reliable measure of whether a CDMA-signal consisting of data sequences and pilot sequence is present at all. If white noise is present instead, the output signal of the coherent averaging unit 18 is attenuated by the decimation gain, while the amplitude of the signal of the incoherent averaging unit 22 remains the same. For this reason, the signal at the output of the subtracter 29 is in this case usually negative and the probability that a positive value is present is extremely small. If a CDMA-signal in the form described is present, the coherent averaging unit 18 supplies a positive value, i.e. the amplitude of the pilot sequence, at the time point of the correct timing $t_0$, while the incoherent averaging unit 22 generates no signal at the time point $t_0$.

A positive signal is therefore present at the output of the subtracter 29. The sign of the output signal of the subtracter 29 is therefore the criterion of whether a CDMA-signal is being received. This can be used both in measuring systems and in the receiver of a mobile station or a base station.

Figure 5:
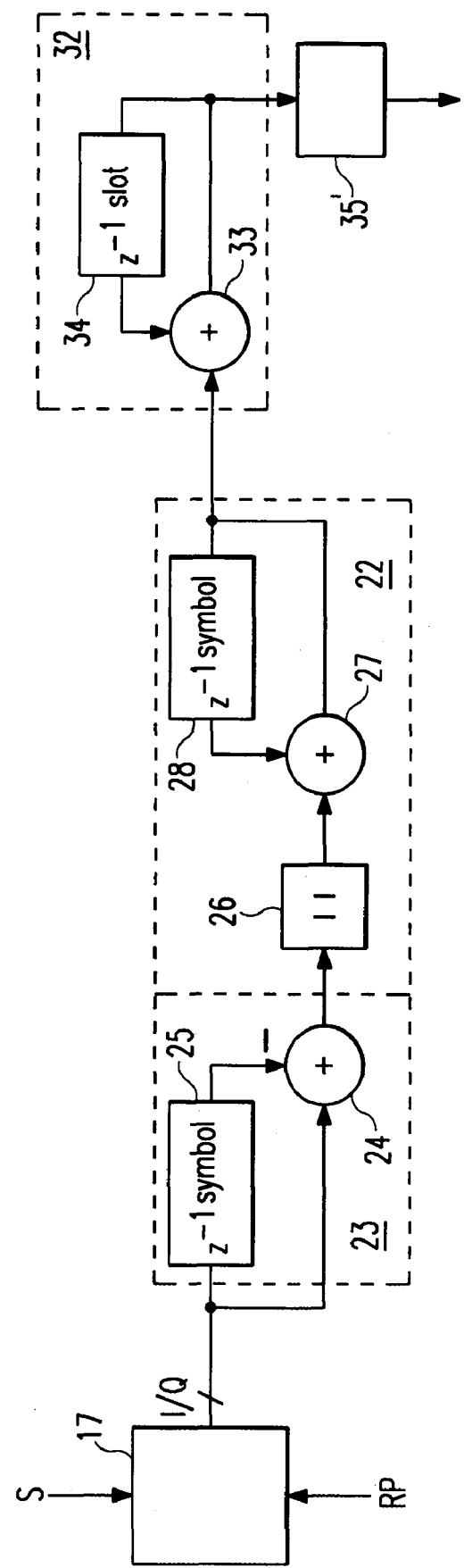
FIG. 5 is a block diagram of a second embodiment device according to the invention for synchronising for example a receiver to a CDMA-signal containing a pilot sequence.

FIG. 5 shows a second embodiment of the invention which is more simplified compared to the embodiment of FIG. 4. Elements already described with respect to FIG. 4 have the same reference numbers so that the respective description need not be repeated.

The main difference of the embodiment shown in FIG. 5 with respect to the embodiment shown in FIG. 4 is, that only the lower branch, i.e. subtracting arrangement 23 and incoherent averaging unit 22 are used in the embodiment of FIG. 5. Thus, subtracter 29 and amplifying or attenuating elements 30 and 31 are not needed, and due to the missing sign inversion of subtracter 29, now a minimum instead of a maximum must be searched for.

As previously described, correlator 17 correlates the total signal S consisting of the transmitted pilot sequence "Pilot" and transmitted data sequences "Dat." with a reference pilot sequence RP. In the subtracting arrangement 23, subtracter 24 subtracts the correlation result, which is the output of correlator 17, time-delayed by one or more symbol durations of the pilot sequence "Pilot", from the current correlation result in order to suppress the pilot sequence.

In the incoherent averaging unit 22, an incoherent averaging is performed.

As in the embodiment of FIG. 4, the averaging unit 32 is optional. If the averaging unit 32 is applied, time-delay element 34 delays its input-signal by one slot (time slot) duration of the CDMA-signal, so that averaging unit 32 averages over as many slots, as is possible due to the allowed reaction time.

As there is no subtracter 29 and thus the input of device 35' does depend on the positive output of incoherent averaging unit 22 and not on the negative output of incoherent averaging unit 22 as in the embodiment of FIG. 4, device 35' has to search the minimum of its input signal rather than its maximum as in the embodiment of FIG. 4. As there is no subtracter 29 in contrast to the embodiment of FIG. 4, the sign of the output of incoherent averaging unit 22 is no more inverted, and therefore, device 35' now has to search for the minimum of its input signal rather than for the maximum as in the embodiment of FIG. 4.

The embodiment of FIG. 5 is more simplified compared to the embodiment of FIG. 4, as less elements are used. For the extreme case of no pilot-sequence present at all, the optimum weighting factors in FIG. 4 are G1=0 and G2>0. In this case, the embodiment of FIG. 5 is equivalent to the embodiment of FIG. 4 and has therefore the same performance. For the practical case with a pilot sequence present, however, better results can be achieved with the embodiment of FIG. 4.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for synchronizing to a CDMA-signal that contains a pilot sequence, overlaid with data sequences, comprising the following process steps:
    correlating a total signal consisting of a transmitted pilot sequence and transmitted data sequences with a reference pilot sequence;

subtracting the correlation result time-delayed by one or more symbol durations of the pilot sequence from a current correlation result in order to suppress the pilot sequence;
incoherent averaging a resultant signal from the subtraction of the correlation result; and
determining a minimum of the total signal.

2. Method according to claim 1,
wherein the incoherent averaging following the subtracting arrangement is performed by magnitude-formation and subsequent summation over a plurality of symbol durations of the pilot sequence.

3. A method for synchronizing to a CDMA-signal that contains a pilot sequence, overlaid with data sequences, comprising the following process steps:
correlating a total signal consisting of a transmitted pilot sequence and transmitted data sequences with a reference pilot sequence;
subtracting the correlation result time-delayed by one or more symbol durations of the pilot sequence from a current correlation result in order to suppress the pilot sequence;
incoherent averaging a resultant signal from the subtraction of the correlation result;
additionally coherent averaging of the correlation result over a plurality of symbol durations of the pilot sequence;
subtracting the incoherent averaging result from the coherent averaging result; and
determining a maximum of the total signal.

4. Method according to claim 3,
wherein the CDMA-signal is subdivided into a plurality of time slots and after subtraction of the incoherent averaging result from the coherent averaging result an averaging over a plurality of time slots takes place.

5. Method according to claim 3,
wherein the coherent averaging is performed by summation over a plurality of symbol durations of the pilot sequence and subsequent magnitude-formation.

6. Method according to claim 3,
wherein the incoherent averaging following the subtracting arrangement is performed by magnitude-formation and subsequent summation over a plurality of symbol durations of the pilot sequence.

7. Method according to claim 3,
wherein a weighting of the incoherent averaging result and the coherent averaging result is carried out before the subtraction of the incoherent averaging result from the coherent averaging result.

8. A device for synchronizing to a CDMA-signal that contains a pilot sequence, which is overlaid with data sequences, comprising:
a correlator which correlates a total signal consisting of a transmitted pilot sequence and transmitted data sequences with a reference pilot sequence;
a first time-delay element which time-delays the output signal of the correlator by one or more symbol durations of the pilot sequence;
a first subtracter which subtracts the output signal time-delayed in the first time-delay element from a current output signal of the correlator;
an incoherent averaging unit which incoherently averages the output signal of the first subtracter; and
a device which determines a minimum of the output signal.

9. Device according to claim 8,
wherein the incoherent averaging unit following the subtracting arrangement consists of a second summator, a third time-delay element connecting the output of the second summator to an input of the second summator, said third time-delay element time-delays by one or more symbol durations of the pilot sequence, and wherein a second magnitude-forming element is connected to the input of the second summator.

10. A device for synchronizing to a CDMA-signal that contains a pilot sequence, which is overlaid with data sequences, comprising:
a correlator which correlates a total signal consisting of a transmitted pilot sequence and transmitted data sequences with a reference pilot sequence;
a first time-delay element which time-delays the output signal of the correlator by one or more symbol durations of the pilot sequence;
a first subtracter which subtracts the output signal time-delayed in the first time-delay element from a current output signal of the correlator;
an incoherent averaging unit which incoherently averages the output signal of the first subtracter;
a coherent averaging unit which coherently averages the output signal of the correlator over a plurality of symbol durations of the pilot sequence;
a second subtracter which subtracts the output signal of the incoherent averaging unit from the output signal of the coherent averaging unit; and
a device which determines the a maximum of the output signal of the second subtracter.

11. Device according to claim 10,
wherein the CDMA-signal is subdivided into a plurality of time slots and wherein an averaging unit is connected to the output of the second subtracter and averages the output signal of the second subtracter over a plurality of time slots.

12. Device according to claim 10,
wherein the coherent averaging unit consists of a first summator, a second time-delay element connecting the output of the first summator to an input of the first summator, said second time-delay element time-delays over one or more symbol durations of the pilot sequence, and wherein a first magnitude-forming element is connected to the output of the first summator.

13. Device according to claim 10,
wherein the incoherent averaging unit following the subtracting arrangement consists of a second summator, a third time-delay element connecting the output of the second summator to an input of the second summator, said third time-delay element time-delays by one or more symbol durations of the pilot sequence, and wherein a second magnitude-forming element is connected to the input of the second summator.

14. Device according to claim 10,
wherein amplifying or attenuating elements are connected to the output of the coherent averaging unit and/or the output of the incoherent averaging unit following the subtracting arrangement in order to define the weighting ratio of the output of the coherent averaging unit in relation to the output of the incoherent averaging unit.

* * * * *